UNITED STATES PATENT OFFICE.

THOMAS MATHIESON THOM, OF WOOD GREEN, ENGLAND.

PRODUCTION OF ARTIFICIAL STONE FROM LIMESTONE.

SPECIFICATION forming part of Letters Patent No. 687,079, dated November 19, 1901.

Application filed July 25, 1899. Serial No. 725,093. (No specimens.)

*To all whom it may concern:*

Be it known that I, THOMAS MATHIESON THOM, of 59 Lordship Lane, Wood Green, in the county of Middlesex, England, have invented certain new and useful Improvements in the Treatment of Limestone for the Production of Artificial Stone Therefrom, of which the following is a specification.

The present invention has reference to the production of artificial stone suitable for use as stone for lithographic and other purposes. In the production of such stone it is usual to take caustic lime, which after being slaked is compressed into blocks or slabs, the latter being finally treated with carbonic-acid gas. This method has not, however, proved very successful on account of the indifferent processes employed in calcining the limestone and introducing carbonic-acid gas.

The present invention comprises a method of calcining the limestone which will produce caustic lime in a chemically-pure condition and at the same time yield carbonic-acid gas in sufficient purity and volume to provide for the treatment, with the necessary pressure, of the molded slabs without aid from any other source.

According to this invention limestone (preferably marble-chips, which is a particularly pure form) is calcined in a closed kiln with the aid of carbonic oxid and hydrogen, to which is added a supply of oxygen gas. The carbonic oxid and hydrogen may be conveniently obtained by means of a gas-producer, which is filled with coke or similar carbonaceous material and worked with oxygen and steam in place of air and steam. In the kiln during the calcining operation, wherein the carbonic oxid, hydrogen, and oxygen gases are used and from which atmospheric air is carefully excluded, is formed the carbonic-acid gas to be afterward used for impregnating the slabs. This carbonic-acid gas, which is drawn off, washed, cooled, and stored until required, is of exceptional purity, containing only, as revealed by actual tests, a very moderate percentage of oxygen and nitrogen. One experiment shows that in one hundred and twenty minutes from the time of lighting the kiln eighty-one per cent. carbonic-acid gas has been produced, with only nineteen per cent. excess of nitrogen and excess of oxygen. Other experiments have not given so perfect a result; but in all cases a sufficiency of carbonic acid is obtained for impregnating, under pressure, all the slabs that can be molded from the limestone burned. After burning the lime is slaked, sieved, and worked up, and when thoroughly mixed is consolidated into blocks or slabs of suitable dimensions with the aid of molds.

If desired, vacuum-pumps may be used for withdrawing the air from the molds in advance of the material fed into them by means of hoppers in the usual way. Slight pressure only, however, is required in the molds, the action of the carbonic-acid gas being relied on to give the required hardness to the stone.

The impregnation of the slabs is effected in a closed chamber, into which they are introduced after drying, a pressure of ten to twenty atmospheres being employed and continued until the blocks are completely converted into carbonate of lime.

If desired, the blocks may be placed in water, into which the carbonic acid is forced by a pump, as is usual in the dry method.

I claim—

1. The process of producing blocks or slabs of artificial lithographic stone, which consists in calcining limestone in a kiln from which air is excluded, by burning in contact with said stone carbonic oxid and hydrogen with oxygen, thereby producing chemically-pure caustic lime and an excess of pure carbonic-acid gas composed of that which is eliminated from the limestone and that which is the product of combustion of said gases, storing such pure gas, slaking and subsequently molding said caustic lime into blocks or slabs, and indurating them by impregnation under pressure with said pure carbonic-acid gas, whereby economy in operation is effected and an improved product is obtained, substantially as described.

2. In the manufacture of artificial lithographic stone, the preliminary steps or operations of treating the stone and obtaining the necessary supply of carbonic-acid gas for subsequently completing the process, which consists in calcining limestone in a kiln from which air is excluded by burning in contact with said stone carbonic oxid and hydrogen with oxygen, thereby producing chemically-pure caustic lime and an excess of pure carbonic-acid gas, composed of that which is eliminated from the limestone and that which is the product of combustion of said gases, substantially as described.

London, England, July 14, 1899.

THOMAS MATHIESON THOM.

Witnesses:
H. K. WHITE,
FRED C. DAVIS.